Patented Oct. 18, 1932

1,882,738

UNITED STATES PATENT OFFICE

ALBERT E. BECKER, OF OGDEN, UTAH

PROCESS OF SEPARATING EXTRACTS FROM GRAIN

No Drawing.   Application filed August 1, 1930.   Serial No. 472,503.

My invention relates to a process of separating extracts from grain in the manufacture of near beer and other beverages made from malt and cereals.

In the old process of making beer the malt or malt and cereals are mixed with water and subjected to a cooking operation in a mash tub. The mash tub has a removable perforated false bottom or strainer a short distance above its true bottom, a suitable outlet from the space between the true and the false bottom, a steam heating appliance for maintaining the heat of the mash at the proper temperature, a stirrer for keeping the mash well mixed and a sparger or over sprayer for supplying water to the mash as the liquid is drawn out, carrying the extracts from the malt and other cereals. As the liquid extracts flow by gravity only from the mash the process is slow and a great deal of water is required to dissolve and carry off the extracts with anything like completeness and the liquid product is likely to be too much diluted. The removal of the spent mash from the mash tub is a matter of considerable difficulty and the extracts remaining in the mash are necessarily lost.

When unmalted cereals, such as corn or rice, are used they are usually cooked in a separate vessel with about thirty percent of malt added, being added to the mixture in the mash tub, boiled to raise the mixture to the desired temperature to convert the starch of the cereals into the sugar desired for the particular finished product, it being necessary to boil unmalted cereal to gelatinize the flinty starch before adding it to the mash tub to facilitate conversion by the malt into sugar.

In the process of my invention the malt and cereals are mixed in a tank without a false bottom but preferably having a conical bottom with a valve controlled outlet at the apex of the cone of sufficient size to permit the mash to flow freely through it, the tank being provided with a stirrer and with means for supplying hot water in spray, and for introducing steam to effect the cooking operation, the amount of water and steam thus introduced being so regulated as not to dilute the extract below a desired density. The grains in the tank will be covered to a suitable depth with hot water sprayed onto the mass which is constantly stirred to mix the water with the grains and steam is injected to bring the mass to and maintain it at the proper temperature to cause complete saturation of the grain with hot water and complete diffusion of the extracts carried by the grain.

When this extraction has been carried to the point of completeness the mass or mixture of extracts and saturated grains is allowed to flow from the tank to the mixing tank of a vacuum filter of a type adapted to take off one kind of liquor comprising a hollow filter drum, means for rotating it, means for exhausting air from the interior of the drum, means for scraping the deposit from the outside of the drum, means for spraying water at varying temperature onto the cake deposited on the drum and means for stirring the mixture.

The exhaust creates a difference in pressure between the atmospheric pressure on the mixture and the interior of the filter drum which causes the liquid extracts to flow through the walls of the filter drum leaving the solid particles of the grain in a cake on its exterior. This cake is sprayed as it is formed with hot water or hot water and steam to ensure thorough extraction and the cake is scraped off as soon as it accumulates to such thickness as to tend to interfere with free flow of the liquid, that is, to a thickness approaching one inch. As the water sprayed onto the cake formed on the filter drum dilutes the extract it is important that in the preparation of the mash in the tank before it is transferred to the mixing tank of the vacuum the amount of water used should be so far restricted that the extracts there produced shall be of somewhat greater density than is desired in the final product.

By thus effecting the cooking operation in a separate tank the extraction of the soluble extracts from the grain is more rapid than in a mash tank having the usual false bottom and when the mash has flowed out of the tank it requires very little attention to make it ready for a fresh change of grain.

The separation of the extracts from the grain in the vacuum filter is rapid and complete.

Having thus described my invention, what I claim is:

1. In a process of extracting and recovering extracts from malt or cereals in which the grain is first cooked and the fluids separated from the solid matter by vacuum filtering, effecting the cooking by introducing steam into the mass of malt or cereal and spraying water onto its surface with such regulation of the steam and water supplied that the liquid extracts will be of a density above that desired in the final product, and supplying water to the material which does not pass through the filter to dilute the extracts to the density desired.

2. In a process of extracting and recovering extracts from malt or cereal in which the grain is first cooked and the fluid extracts separated by vacuum filtering effecting the cooking by introducing steam into the mass of malt or cereal and spraying water onto its surface with such regulation of the steam and water that the liquid extracts will be of a density above that desired in the final product, causing the cooked mixture to flow into the tank of a vacuum filter, separating the liquid extracts from the solid material by use of a vacuum and supplying water to the solid material which does not pass through the filter in sufficient quantity to dilute the liquid extracts to the density desired.

In testimony whereof, I hereunto affix my signature.

ALBERT E. BECKER.